(12) United States Patent
Day et al.

(10) Patent No.: US 7,539,787 B2
(45) Date of Patent: May 26, 2009

(54) DESTRUCTIVE DMA LISTS

(75) Inventors: Michael N. Day, Round Rock, TX (US); Charles R. Johns, Austin, TX (US); Barry L. Minor, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 364 days.

(21) Appl. No.: 11/252,532

(22) Filed: Oct. 18, 2005

(65) Prior Publication Data

US 2007/0088866 A1    Apr. 19, 2007

(51) Int. Cl.
*G06F 13/00* (2006.01)
*G06F 5/00* (2006.01)

(52) U.S. Cl. .......................... 710/22; 710/53

(58) Field of Classification Search .................... 710/60, 710/22, 52, 53, 54, 55, 56, 57
See application file for complete search history.

(56) References Cited

U.S. PATENT DOCUMENTS

| | | | |
|---|---|---|---|
| 5,732,223 A * | 3/1998 | Moore et al. | 710/52 |
| 5,870,627 A | 2/1999 | O'Toole et al. | |
| 6,018,612 A * | 1/2000 | Thomason et al. | 386/82 |
| 2002/0078317 A1 | 6/2002 | Yasoshima | |
| 2003/0048886 A1 * | 3/2003 | Gonikberg | 379/93.01 |
| 2003/0056037 A1 * | 3/2003 | Rogers | 710/22 |
| 2004/0062246 A1 * | 4/2004 | Boucher et al. | 370/392 |

FOREIGN PATENT DOCUMENTS

JP    2002-259115    9/2002

* cited by examiner

*Primary Examiner*—Henry W. H. Tsai
*Assistant Examiner*—Hyun Nam
(74) *Attorney, Agent, or Firm*—Stephen J. Walder, Jr.; Matthew B. Talpis

(57) ABSTRACT

A buffer, a method, and a computer program product for DMA transfers are provided that are designed to save memory space within a local memory of a processor. The buffer is a return buffer with a portion reserved for DMA lists. A DMA controller accomplishes DMA transfers by: reading address elements from a DMA list located in the DMA list portion; reading the corresponding data from system memory; and copying the corresponding data to the return buffer portion. This buffer saves space because when the buffer begins to fill up the corresponding return data can overwrite the data in the DMA list. Accordingly, the DMA list overlays on top of the return buffer, such that the return data can destruct the DMA list and the extra storage space for the DMA list is saved.

11 Claims, 5 Drawing Sheets

DESTRUCTIVE DMA LISTS

FIELD OF THE INVENTION

The present invention relates generally to saving space in memory, and more particularly, to saving space in memory by implementing DMA lists and return buffers to share the same storage in allocated buffer space.

DESCRIPTION OF THE RELATED ART

Direct Memory Access ("DMA") refers to a technique for transferring data from main memory to local memory independent of the central processing unit ("CPU"). DMA enables data processing systems to transfer data to local memory, which enables quicker data retrieval by a processor. This technique is very useful for quick memory backups and for real-time applications. An example of a real-time application includes processing data for streaming videos.

FIG. 1 is a block diagram of a processor with DMA capabilities 100. Memory controller 104 controls the flow of data into and out of the processor 102. Memory controller 104 sends control signals to aid in the operation of instruction unit 106. Instruction unit 106 issues the instructions that will be executed. Instruction unit 106 issues instructions to execution unit 108. Execution unit 108 executes the instructions. The local memory 110 can store instructions and data results. Instruction unit 106 and execution unit .108 retrieve instructions or data results from local memory 110 when necessary. Execution unit 108 also stores data results to local memory 110. Memory controller 104 sends signals to aid in the storage and retrieval of data to or from local memory 110. The local memory 110 serves as the data storage for processor 102. Processor 102 may contain many other components that are not shown in FIG. 1.

System memory 112 exists outside of processor 102 and stores data for multiple processors. System memory 112 may store data for a complete data processing system. DMA controller 114 interfaces to system memory 112. Therefore, DMA controller 114 can retrieve data from system memory 112. Accordingly, DMA controller 114 coordinates the retrieval of data from system memory 112 for processor 102. FIG. 1 is a basic representation of a processor with DMA capabilities and does not limit the scope of the present invention.

In FIG. 1, DMA involves the transfer of data from system memory 112 to local memory 110 so that processor 102 can retrieve the data quickly. In a data processing system, processor 102 can retrieve data from local memory 110 much quicker than it can retrieve data from system memory 112. In FIG. 1 processor 102 cannot retrieve data directly from system memory 112, but other data processing systems may enable a processor to retrieve data directly from system memory 112. When processor 102 needs data quickly, it is advantageous to be able to retrieve the data from local memory 110 rather than system memory 112 because the data buses for system memory 112 are usually more congested and system memory 112 may be located at a far distance from processor 102. When processor 102 wants data from system memory 112 to be transferred to local memory 110 it sends control signals to DMA controller 114. This process will be described in further detail with reference to FIG. 2. Then DMA controller 114 retrieves the desired data from system memory 112 and stores the data in local memory 110. DMA controller 114 transfers all of the desired data from system memory 112 to local memory 110 piece by piece, until all of the desired data is stored in local memory 110. Once the desired data is stored in local memory 110, processor 102 can retrieve the data more quickly. The ability to retrieve data from local memory is advantageous for real-time applications, such as streaming video. FIG. 1 is a broad example of DMA for a processor and does not limit the scope of the present invention.

FIG. 2 is a block diagram of a conventional DMA configuration 200 including a local memory 110, a DMA controller 114, and a system memory 112. Local memory 110, DMA controller 114, and system memory 112 are the same components as illustrated in FIG. 1. DMA controller 114 uses a return buffer 202 and a DMA list 204 to accomplish DMA transfers from system memory 112. DMA list 204 and return buffer 202 are conventional buffers that store data and reside at local memory 110. DMA controller 114 interfaces system memory 112 through communication channel 210. As previously described, DMA transfers involve moving data stored in system memory 112 to local memory 110 for quicker access by a processor.

DMA list 204 contains the addresses for the data to be transferred from system memory 112. Accordingly, DMA list 204 must be constructed before a DMA transfer is possible. The pointer 208 points to DMA list 204. DMA list 204 comprises DMA command elements each of which contains an effective address of the data and a size of the data. In other DMA implementations the command elements in DMA list 204 contain only an effective address. DMA controller 114 receives the first command from pointer 208 and reads the corresponding piece of data from system memory 112 through communication channel 210. Then, DMA controller 114 inserts the first piece of data into return buffer 202 through pointer 206. Accordingly, the piece of data transferred to return buffer 202 at pointer 206 corresponds to the previous command element in DMA list 204 at pointer 208. After this, DMA controller 114 receives a second command element through pointer 208. DMA controller 114 reads the data corresponding to this second address from system memory 112 and transfers the corresponding piece of data to return buffer 202. Accordingly, pointers 206 and 208 increment down return buffer 202 and DMA list 204 as the DMA transfer progresses.

This process continues until all of the data corresponding to the addresses in the DMA list 204 transfers from system memory 112 to return buffer 202. DMA controller 114 executes the DMA command elements contained in DMA list 204 until the list is exhausted. DMA controller 114 executes command elements sequentially in DMA list 204 and returns data into return buffer 202 through pointer 206. Accordingly, low addresses are first and high addresses are last in return buffer 202. This conventional configuration shows a buffer 204 for the DMA list and an independent buffer 202 for the return buffer. Each DMA list 204 can consume up to 16 KB of the 256 KB in a typical local memory 110. The return data buffer for the maximum size DMA list can be anywhere from 32 KB to 256 KB. Therefore, DMA lists 204 and return buffers 202 for DMA consume large amounts of storage in local memory 110. Furthermore, typically these buffers 202, 204 are statically allocated so this storage is permanently removed from the pool of local memory 110.

There is a need for reducing the storage area of DMA lists 204 and return buffers 202 in local memory 110, while still enabling DMA transfers from system memory 112 to local memory 110. It is clear that a method to reduce the storage area of DMA lists 204 and return buffers 202 in local memory 110 would be a vast improvement over the prior art.

SUMMARY OF THE INVENTION

The present invention provides a buffer, a method, and a computer program product for DMA transfers that are designed to save memory space within a local memory of a processor. The buffer is a return buffer with a portion reserved for DMA lists. The DMA list portion is at the bottom of the modified buffer. A DMA controller accomplishes DMA transfers by: reading address elements from a DMA list located in the DMA list portion; reading the corresponding data from system memory; and copying the corresponding return data to the modified buffer. This buffer saves space because when the buffer begins to fill up the corresponding return data from system memory can overwrite the data in the DMA list. Accordingly, the DMA list overlays on top of the return buffer, such that the return data can destruct the DMA list and the extra storage space for the DMA list is saved.

A few rules must be followed to enable this buffer to function properly. The DMA list portion of the buffer must be at the bottom so that data written to the modified buffer does not overwrite data in that portion prematurely. The end of the DMA list must also align with the end of the buffer. The size of the command elements within the DMA list must be less than or equal to the minimum return data size so that the last command element in the DMA list is not partially overwritten by return data transferred to the buffer.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are implemented in hardware in order to provide the most efficient implementation. Alternatively, the functions may be performed by a processor such as a computer or an electronic data processor in accordance with code such as computer program code, software, and/or integrated circuits that are coded to perform such functions, unless indicated otherwise.

Figure 1:
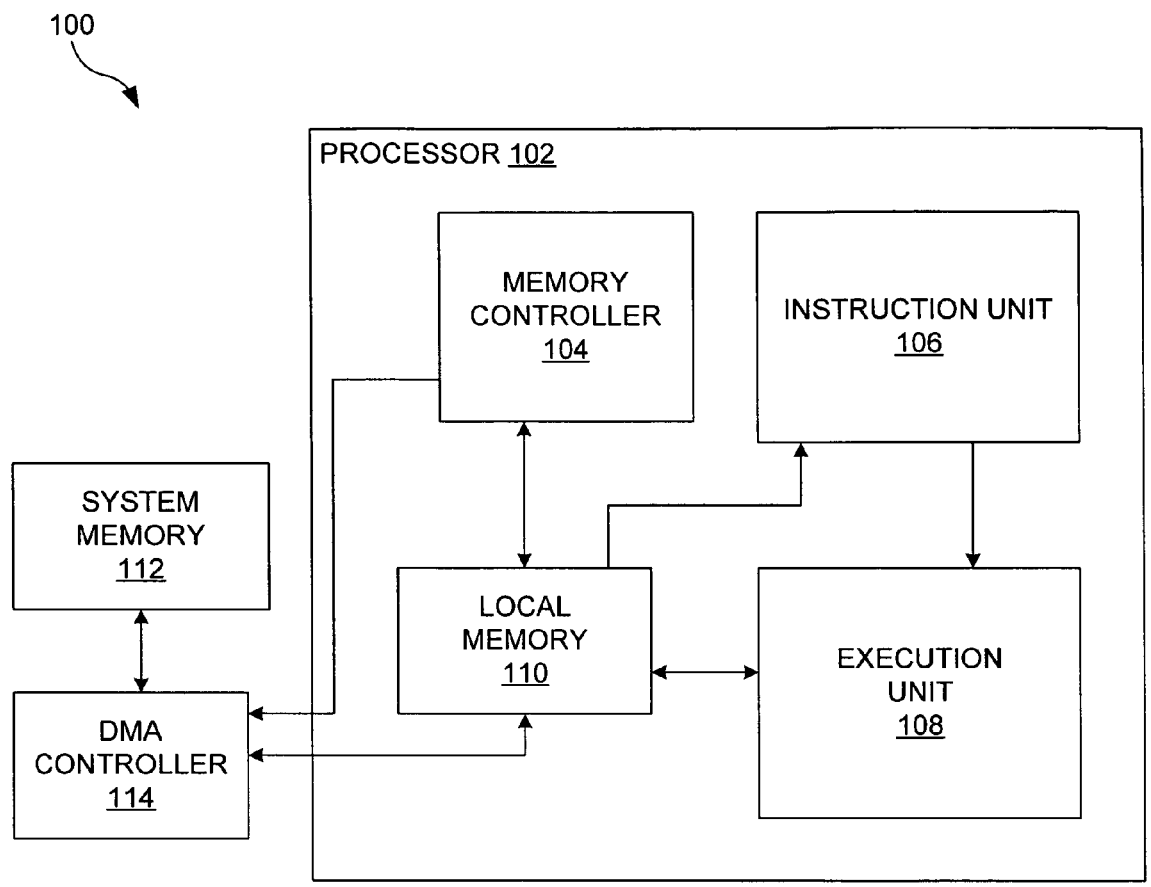
FIG. 1 is a block diagram of a conventional processor with DMA capabilities.
Figure 2:
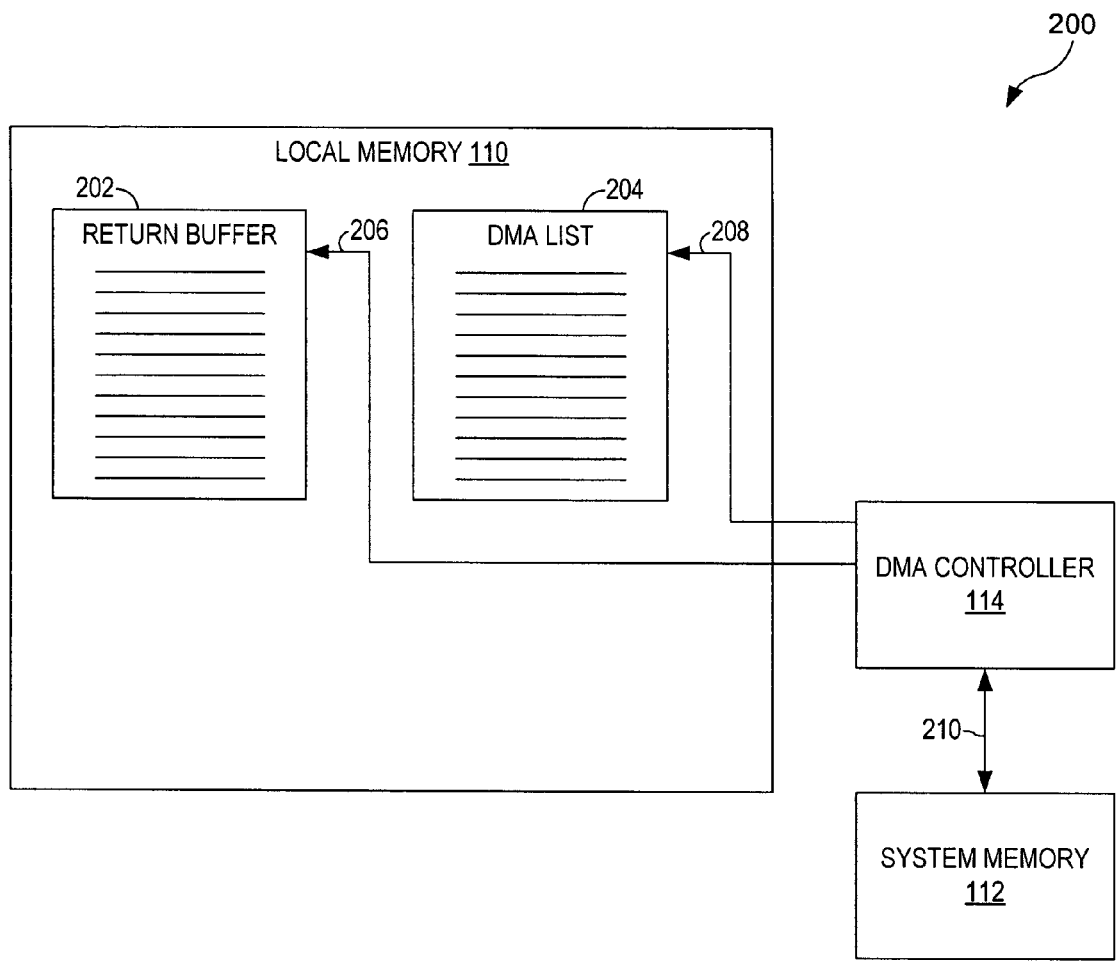
FIG. 2 is a block diagram of a conventional DMA system including a local memory, a DMA controller, and a system memory.
Figure 3:
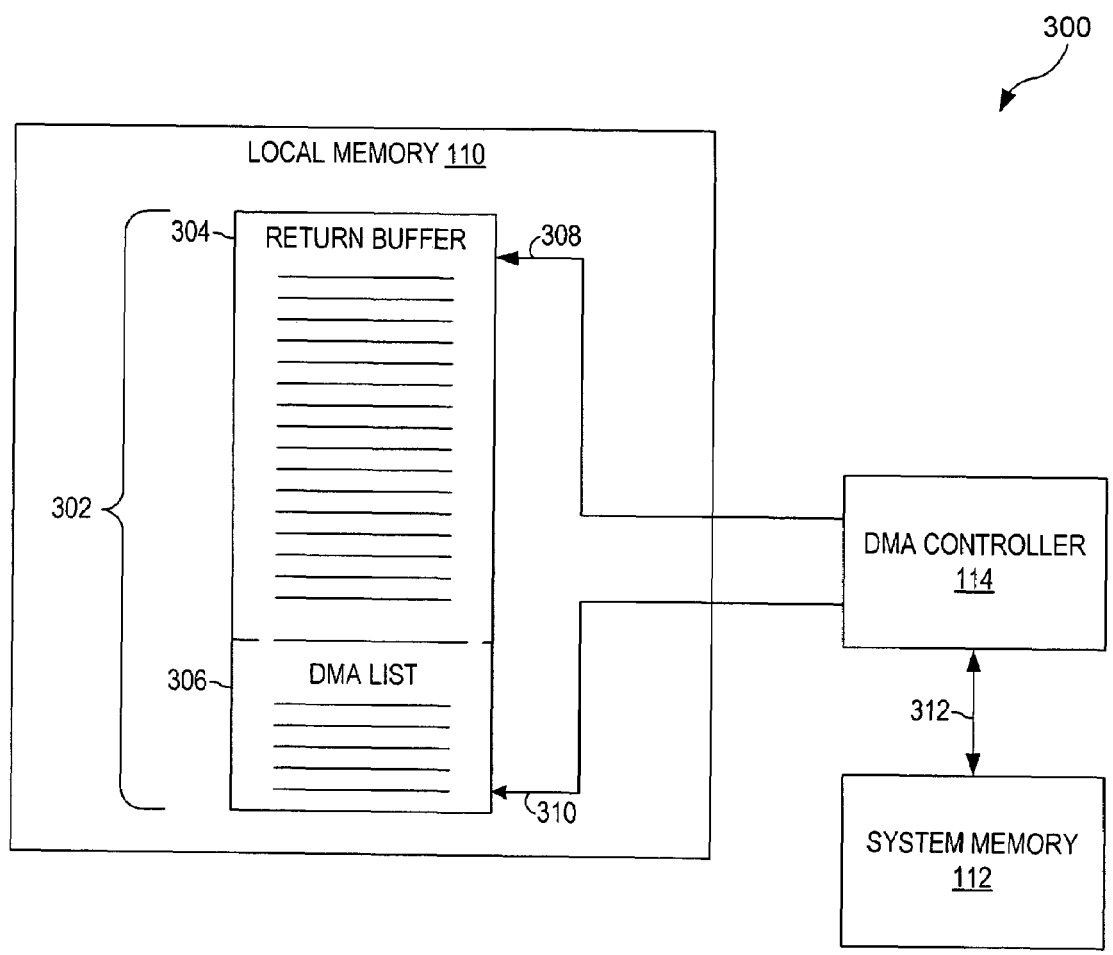
FIG. 3 is a block diagram of a modified DMA system including a local memory, a DMA controller, and a system memory.

FIG. 3 is a block diagram of a modified DMA configuration 300 including a local memory 110, a DMA controller 114, and a system memory 112. Local memory 110, DMA controller 114, and system memory 112 are the same components as illustrated in FIGS. 1 and 2. DMA controller 114 uses allocated buffer space 302 to accomplish DMA transfers from system memory 112 to local memory 110. Accordingly, return buffer 304 is a return buffer that is the same size as buffer space 302. DMA command buffer 306 overlays on top of return buffer 304 at the bottom of the buffer 304. Throughout this description, when describing these buffers, the top of the buffer refers to the lower address range and the bottom of the buffer refers to the upper address range. DMA controller 114 interfaces system memory 112 through communication channel 312. As previously described, DMA transfers involve moving data stored in system memory 112 to local memory 110 for quicker access by a processor.

One notable difference between FIG. 3 and FIG. 2 is that DMA command buffer 306 overlays a portion of return buffer 304. During a DMA transfer, DMA controller 114 begins by placing data from system memory 112 into the top (lower address range) of buffer 304. As more data fills buffer 304, the DMA controller 114 must place data towards the bottom (higher address range) of buffer 304 and overwrite the DMA list in DMA command buffer 306. The DMA list (not shown) resides within DMA command buffer 306.

Pointer 310 points to the current command element in DMA command buffer 306. The first command element corresponds to the address within system memory 112 of the first piece of data for the DMA transfer. In one embodiment of the present invention the command elements in the DMA list contain two address elements of data: the address within system memory 112 and the size of the piece of data. DMA controller 114 receives the first address from pointer 310 and reads the corresponding piece of data from system memory 112 through communication channel 312. Then, DMA controller 114 inserts the first piece of data into return buffer 304 through pointer 308. Pointer 308 points to the current fill location in return buffer 304. Accordingly, the piece of data transferred to buffer 304 at pointer 308 corresponds to the address in DMA list at pointer 310. After each command element is read by DMA controller 114, pointer 310 increments so that DMA controller 114 then pulls the next command element from the DMA list. DMA controller 114 reads this second address from system memory 112 and transfers the corresponding piece of data to buffer 304. DMA controller 114 inserts the return data into buffer 304 at the new start fill location that is shown by pointer 308. Accordingly, pointer 308 moves down to a new fill location after each piece of return data is inserted. Initially, pointer 310 points to the lower address range of buffer 306 and pointer 308 points to the lower address range of buffer 304.

This process continues until the DMA list in DMA command buffer 306 is exhausted, as previously described with reference to FIG. 2. After the DMA list is executed, pointers 308 and 310 both point to the end of buffer 304, which is equal to the upper address range for allocated buffer space 302. By sharing the same buffer 304, DMA list shares the same storage with the return data. Accordingly, the return data eventually overwrites the DMA list in DMA command buffer 306 as the list executes. To ensure that a specific DMA transfer includes all of the necessary data, the DMA list must be constructed with this issue in mind. First, the data size of the command elements in DMA list must be less than or equal to the minimum data size from system memory 112 to be stored in buffer 304. This ensures that the second to last data transfer does not overwrite the last command element in the DMA list. For example, if command element size is one word and data size is two words, then the last command element at the pointer 310 of the DMA list cannot be prematurely overwritten by data transferred to buffer 304. If the command element size is two words and data size is one word, then the data returned can partially overwrite the last element of the DMA list.

Second, DMA command buffer 306 must be placed at the upper address range of buffer 304. This ensures that data transferred to buffer 304 does not overwrite other necessary data. By placing DMA command buffer 306 at the upper address range of return buffer 304, the transferred data begins to replace data from the lower address range in DMA command buffer 306 first. DMA controller 114 executes command elements through pointer 310, so the lower address range of DMA list opens as more command elements are executed. This allows buffer 304 to use the storage space vacated by the DMA list. Accordingly, buffer 304 destructs the DMA list after each complete DMA transfer. Therefore, buffer 304 can be smaller in size than return buffer 202 and DMA list 204 (FIG. 2) combined, because buffer 304 can use the storage space of DMA command buffer 306. This feature of the present invention allows DMA transfers to be accomplished while utilizing less storage space in local memory 110. The modified configuration saves the storage space in local memory 110 for conventional DMA lists 204. If conventional DMA lists 204 are 16 KB, then local memory 110 has 16 KB of additional data storage. This additional storage space enables a processor to store larger amounts of data in local memory, which can be beneficial for processor applications.

After each DMA element list is destructed, a new DMA list must be constructed for a new DMA transfer. Due to this configuration the construction of DMA lists is different than conventional methods. One method is to construct the DMA list backwards from the upper address range of DMA command buffer 306. This method comprises inserting the last element in the DMA list first and the first element in the DMA list last. Therefore, sequentially writing from the last element to the first element in the DMA list forces the last element in the DMA list to the lower address range of DMA command buffer 306. The other method is to insert the first element in the DMA list at the lower address range of the DMA command buffer 306. Then, sequentially writing the following elements forces the first element to the upper address range of the DMA command buffer 306. Through both of these methods the DMA controller 114 can execute the first element in the DMA list through pointer 310 and sequentially execute the rest of the elements.

These DMA lists must also be constructed such that the pieces of return data being stored in buffer 304 do not get ahead of the DMA list. Accordingly, the DMA list cannot cause DMA controller 114 to retrieve too much data from system memory 112 such that the return data in buffer 304 overwrites data from the DMA list prematurely. The DMA list must always stay in front of the return data to prevent data collisions.

Other configurations of the allocated buffer space 302 are within the scope of the present invention. Accordingly, DMA command buffer 306 could overlay allocated buffer space 302 at the top (lower address range) of the buffer 302. Therefore, buffer 304 is shown at the bottom (upper address range) of the buffer 302. Normally, DMA controller 114 reads data and stores data from lower address range to higher address range, but in this particular configuration DMA controller 114 reads and stores data from upper address range to lower address range.

Figure 4:
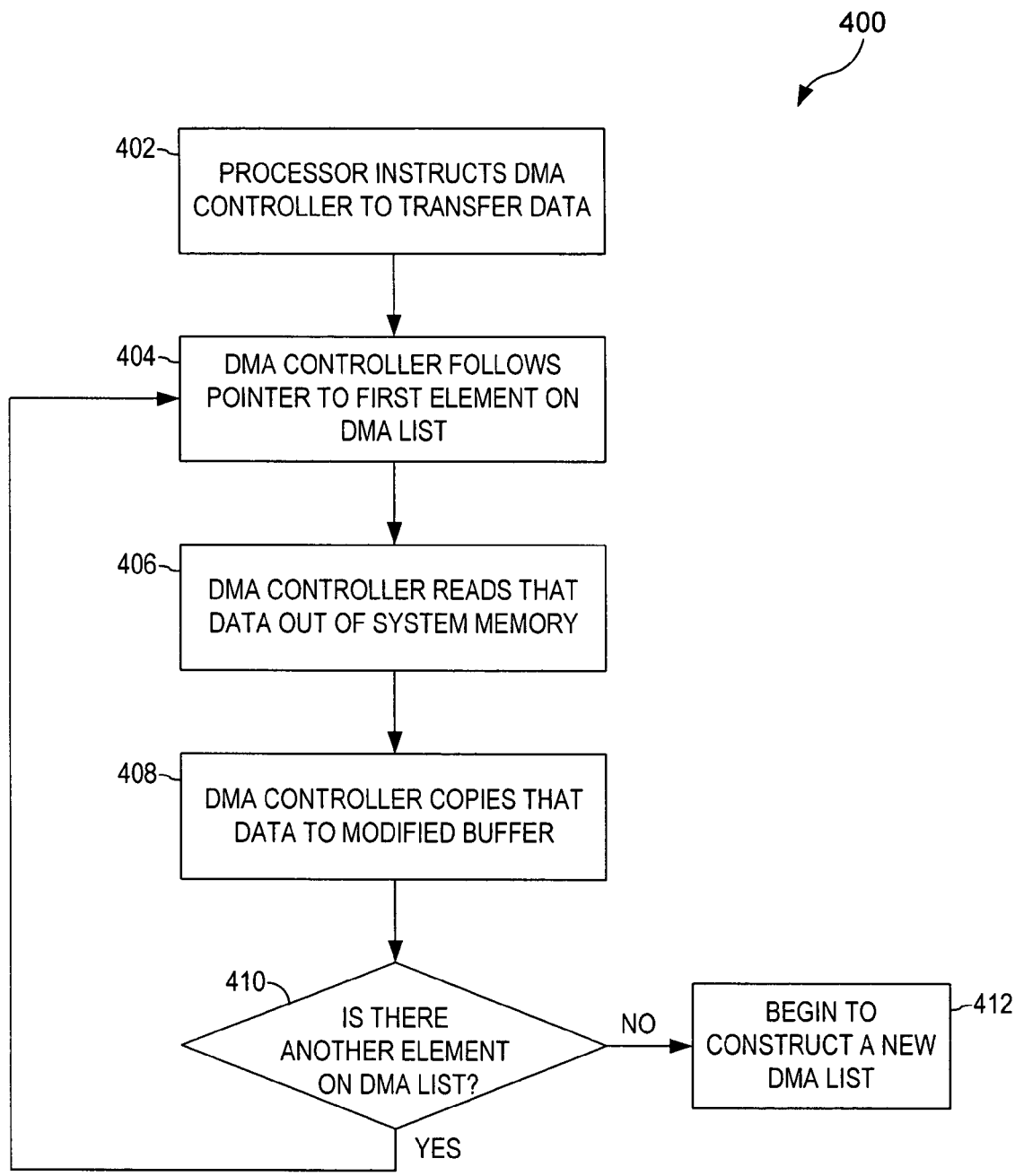
FIG. 4 is a flow chart depicting a DMA data transfer in a modified DMA system.

FIG. 4 is a flow chart depicting a DMA data transfer in a modified DMA system 400. The process begins with the processor instructing DMA controller 114 to transfer data 402 from system memory 112 to local memory 110. In process step 404 DMA controller 114 follows pointer 310 to read the first element on the DMA list in DMA command buffer 306. In one embodiment an element consists of an address for data in system memory 112 and the size of this data. Next, DMA controller 114 reads the data corresponding to that address 406 from system memory 112. DMA controller 114 copies that piece of return data 408 to return buffer 304 by following pointer 308. Accordingly, the copied data fills up the data locations in buffer 304 from the lower address range sequentially downward, and as the DMA transfer continues, the copied data destructs the DMA list. Then, DMA controller 114 determines if there is another element in the DMA list corresponding to data that must be transferred 410. If there is another element in the DMA list, then DMA controller 114 returns to process step 404 and follows pointer 310 to the next element on the DMA list. If there is not another address in the DMA list, then DMA controller 114 waits for a new DMA list to be constructed 412 into DMA command buffer 306 for a subsequent DMA transfer.

Figure 5:
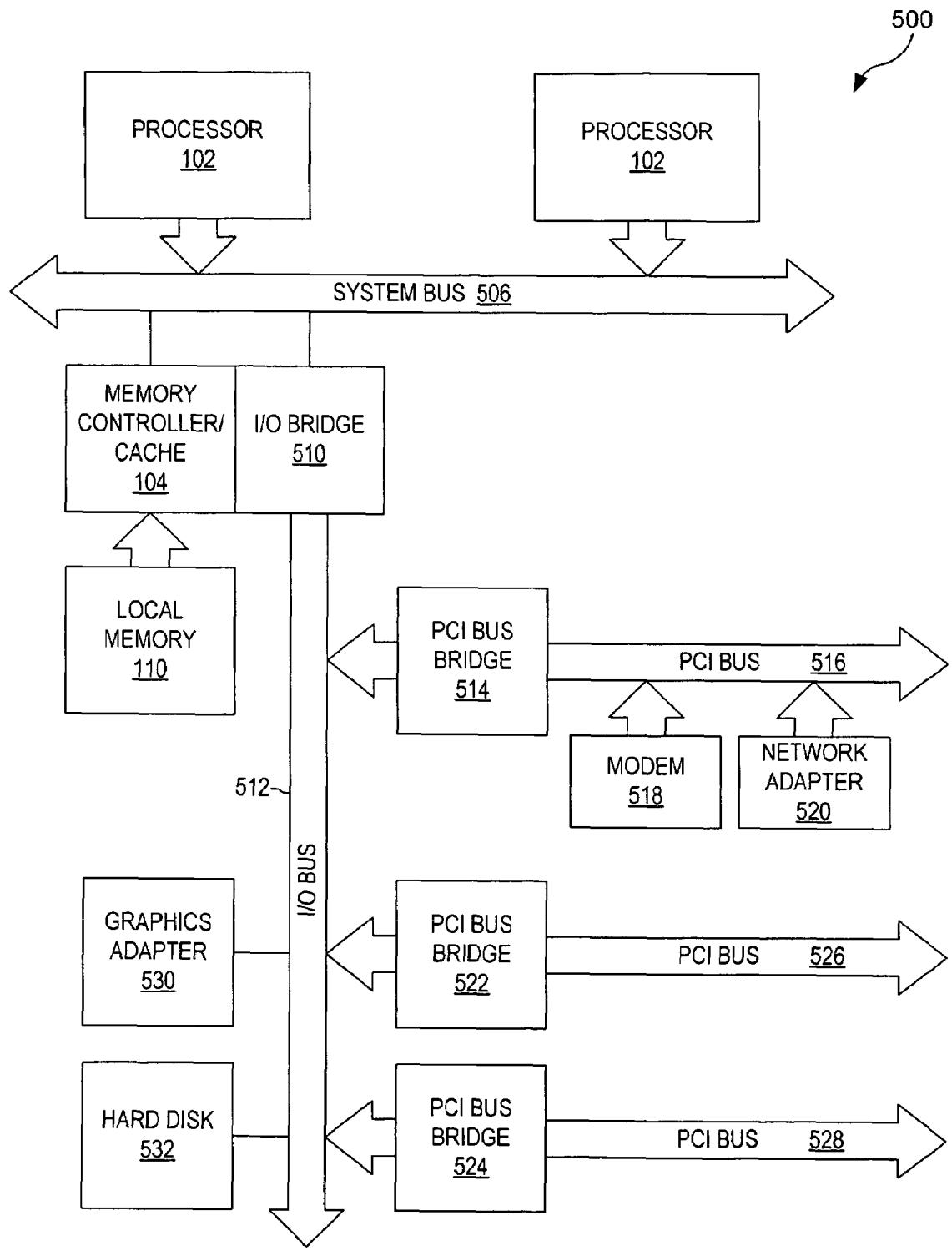
FIG. 5 is a block diagram of data processing system in accordance with an embodiment of the present invention

FIG. 5 depicts a block diagram of data processing system 500 that may be implemented, for example, as a server, client computing device, handheld device, notebook, or other types of data processing systems, in accordance with an embodiment of the present invention. Data processing system 500 may implement aspects of the present invention, and may be a symmetric multiprocessor ("SMP") system or a non-homogeneous system having a plurality of processors 102 connected to the system bus 506. Alternatively, the system may contain a single processor 102.

Memory controller/cache 104 provides an interface to local memory 110 and connects to system bus 506. I/O Bus Bridge 510 connects to system bus 506 and provides an interface to I/O bus 512. Memory controller/cache 104 and I/O Bus Bridge 510 may be integrated as depicted. Peripheral component interconnect ("PCI") bus bridge 514 connected to I/O bus 512 provides an interface to PCI local bus 516. A number of modems may be connected to PCI local bus 516. Typical PCI bus implementations will support four PCI expansion slots or add-in connectors. Modem 518 and network adapter 520 provide communication links to other computing devices connected to PCI local bus 516 through add-in connectors (not shown). Additional PCI bus bridges 522 and 524 provide interfaces for additional PCI local buses 526 and 528, from which additional modems or network adapters (not shown) may be supported. In this manner, data processing system 500 allows connections to multiple network computers. A memory-mapped graphics adapter 530 and hard disk 532 may also be connected to I/O bus 512 as depicted, either directly or indirectly.

Accordingly, the hardware depicted in FIG. 5 may vary. For example, other peripheral devices, such as optical disk drives and the like, also may be used in addition to or in place of the hardware depicted. The depicted example does not imply architectural limitations with respect to the present invention. For example, data processing system 500 may be, for example, an IBM Deep Blue system, CMT-5 system, products of International Business Machines Corporation in Armonk, N.Y., or other multi-core processor systems, running the Advanced Interactive Executive ("AIX") operating system, LINUX operating system, or other operating systems.

It is understood that the present invention can take many forms and embodiments. Accordingly, several variations of the present design may be made without departing from the scope of the invention. The capabilities outlined herein allow for the possibility of a variety of networking models. This disclosure should not be read as preferring any particular networking model, but is instead directed to the underlying concepts on which these networking models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method of configuring a buffer within a local memory of a processor for DMA transfers comprising:
   reserving a first portion of the buffer for a DMA list, wherein the first portion is an upper address range of the buffer;
   configuring the first portion to at least store a DMA list for a DMA transfer, wherein the DMA list contains a plurality of command elements that correspond to data in a system memory, and wherein each command element of the plurality of command elements specifies an address of data to be transferred from the system memory using a DMA transfer;
   configuring the buffer to store return data, corresponding to the plurality of command elements, from the system memory throughout the buffer;
   overwriting the DMA list with the return data; and
   filling the buffer with return data from a lower address range to the upper address range of the buffer such that the DMA list is not overwritten prematurely, wherein the command elements further comprise a first portion representing the address of the corresponding data in system memory and a second portion representing a size of the corresponding return data in system memory, and wherein the command element size is less than or equal to the minimum corresponding return data size.

2. The method of claim 1, further comprising constructing the DMA list before each DMA transfer.

3. The method of claim 2, wherein the step of constructing the DMA list further comprises:
   constructing the DMA list from the upper address range of the first portion of the buffer;
   first inserting the last command element of the DMA list;
   sequentially writing the command elements of the DMA list backwards; and
   last inserting the first command element of the DMA list.

4. The method of claim 2, wherein the step of constructing the DMA list further comprises:
   constructing the DMA list from the lower address range of the first portion of the buffer;
   first inserting the first command element of the DMA list;
   sequentially writing the command elements of the DMA list; and
   last inserting the last command element of the DMA list.

5. The method of claim 1, wherein command elements are processed using a first pointer of a DMA controller that points to a current command element to process, and wherein filling the buffer with return data from the lower address range to the upper address range of the buffer comprises using a second pointer of the DMA controller that points to a next portion of the buffer to fill.

6. The method of claim 5, wherein the first pointer points to addresses within a DMA command buffer portion of the buffer at a lowest address range of the buffer, and wherein the second pointer points to addresses within a return buffer portion of the buffer that encompasses the DMA command buffer portion of the buffer.

7. The method of claim 6, wherein the first pointer moves from a lowest address of the DMA command buffer portion to a highest address of the DMA command buffer portion, and wherein the second pointer moves from a lowest address of the return buffer portion to a highest address of the return buffer portion.

8. The method of claim 7, wherein the highest address of the DMA command buffer portion and the highest address of the return buffer portion are the same.

9. The method of claim 1, wherein the DMA list is destructed after completion of the DMA transfer by virtue of the overwriting of the DMA list.

10. The method of claim 6, wherein the DMA list is constructed in a backwards direction from an upper address range of the DMA command buffer portion by inserting a last command element in the DMA list first into the DMA command buffer portion, and inserting a first command element in the DMA list last into the DMA command buffer portion.

11. The method of claim 6, wherein the DMA list is constructed by inserting a first command element in the DMA list into a lowest address of the DMA command buffer portion and inserting a last command element in the DMA list into a highest address of the DMA command buffer portion.

* * * * *